Oct. 13, 1936.   W. B. EDDISON ET AL   2,057,642
HAIRSPRING ASSEMBLY FOR TIMEPIECES
Filed May 20, 1935    2 Sheets-Sheet 1
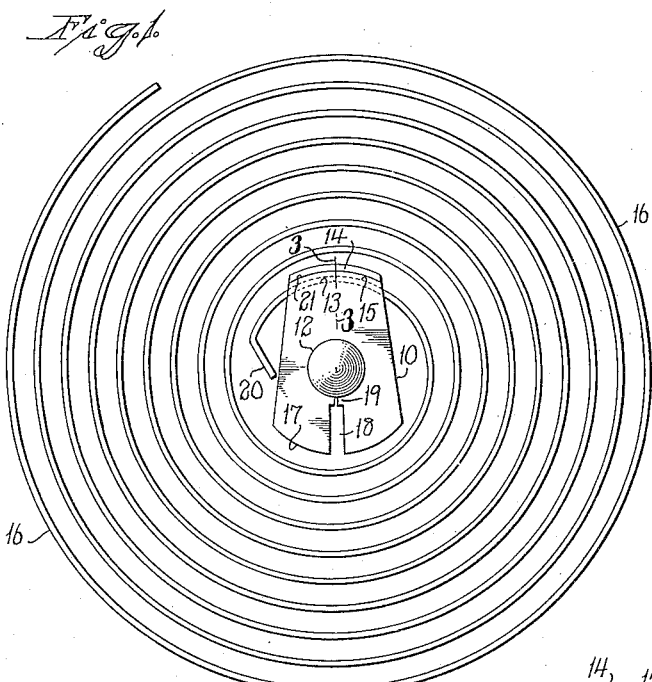
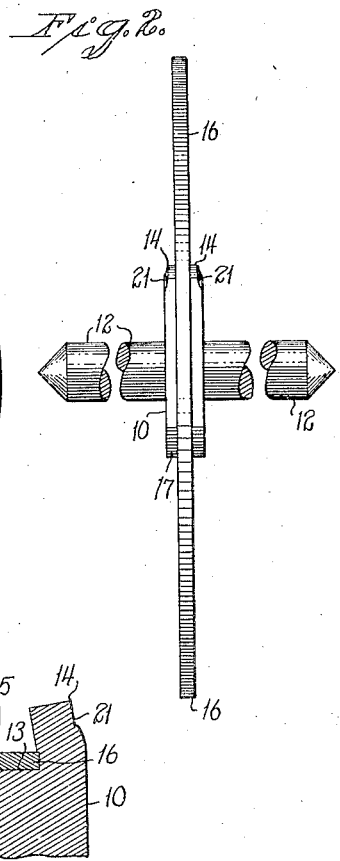
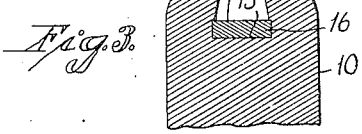
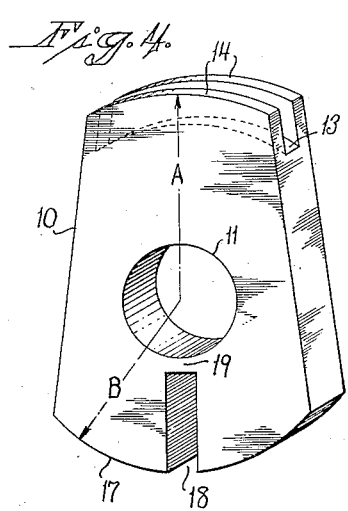
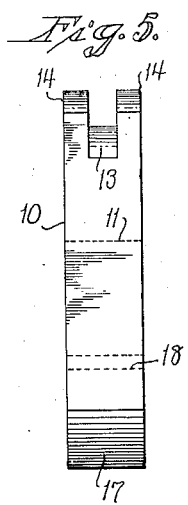
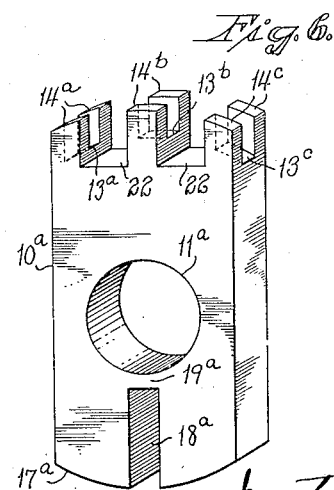

Oct. 13, 1936.  W. B. EDDISON ET AL  2,057,642
HAIRSPRING ASSEMBLY FOR TIMEPIECES
Filed May 20, 1935   2 Sheets-Sheet 2
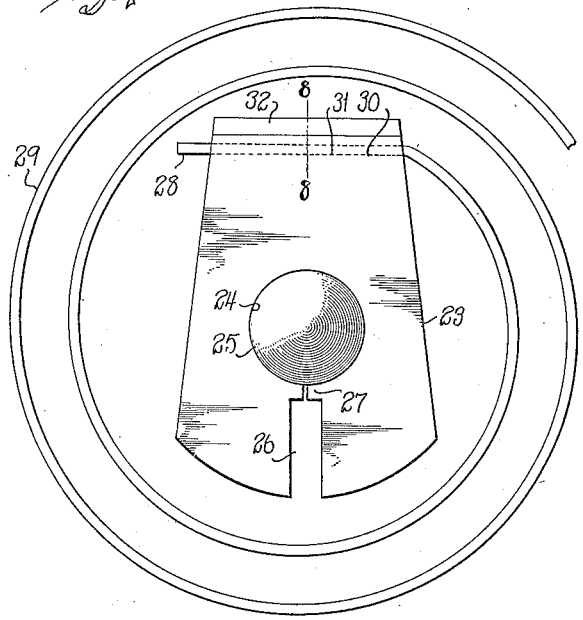
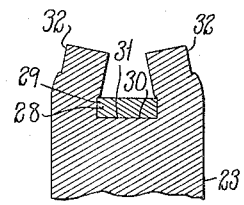
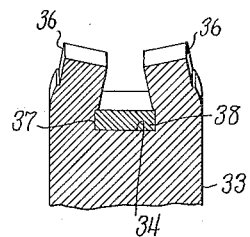
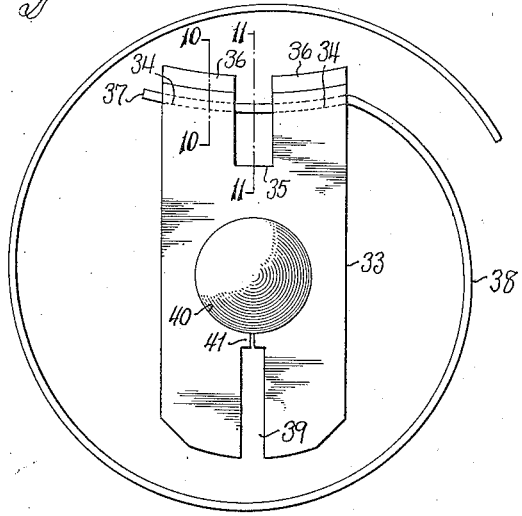
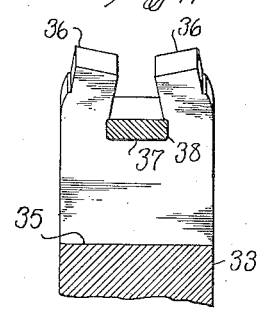

Patented Oct. 13, 1936

2,057,642

UNITED STATES PATENT OFFICE

2,057,642

HAIRSPRING ASSEMBLY FOR TIMEPIECES

William Barton Eddison, Ardsley-on-Hudson, and John V. McAdam, Hastings-on-Hudson, N. Y.

Application May 20, 1935, Serial No. 22,380

4 Claims. (Cl. 58—115)

This invention relates to an improvement in hairspring assemblies, and particularly to hairspring assemblies for clocks, watches, and the like.

Heretofore, as generally constructed, hairspring assemblies have been open to many objections and have varied considerably one from another, especially with respect to angularity between the respective planes of the spiral hairspring and the hub or collet to which the hairspring is secured. Variations of other types have also been largely characteristic of prior hairspring assemblies, among which may be mentioned variations in the degree of concentricity between the balance-staffs and the hairsprings.

Hairspring assemblies having variations such as those above mentioned have required so-called "leveling" and "truing" operations by expert craftsmen before becoming sufficiently uniform or otherwise suitable for use in reliable timepieces.

One of the objects of the present invention is to provide a superior hairspring assembly which may be produced at a low cost for manufacture.

A further object is to provide a superior hairspring assembly which, when duplicated, will possess substantially the same characteristics.

Another object of the present invention is to produce a hairpring assembly which will not require careful leveling or truing before becoming suitable for use in timepieces.

A still further object is to provide a construction by means of which parallelism is assured between the plane of a hairspring and the plane of the collet or hub to which it is secured.

Another object of the present invention is to provide simple and effective means for insuring the substantial uniformity in the concentricity of a hairspring and its hub or collet.

With the above and other objects in view, as will appear to those skilled in the art from the following, considered in conjunction with the accompanying drawings and appended claims, the present invention includes all features disclosed therein which are novel over the prior art.

In the accompanying drawings:

Fig. 1 is a face view of one form which a hairspring assembly embodying the present invention may assume;

Fig. 2 is an edge view thereof;

Fig. 3 is a broken sectional view taken on the line 3—3 of Fig. 1, but on a larger scale;

Fig. 4 is a perspective view of the hub or collet prior to its mounting upon a balance-staff and prior to the attachment of a hairspring thereto;

Fig. 5 is an edge view thereof;

Fig. 6 is a perspective view of another form of hub or collet;

Fig. 7 is a face view of another form of hairspring assembly embodying the present invention;

Fig. 8 is a broken sectional view taken on the line 8—8 of Fig. 7;

Fig. 9 is a broken face view of still another form of hairspring assembly embodying the present invention;

Fig. 10 is a broken sectional view taken on the line 10—10 of Fig. 9; and

Fig. 11 is a broken sectional view taken on the line 11—11 of Fig. 9.

The particular hairspring assembly herein chosen for illustration in Figs. 1 to 5 inclusive, includes a substantially-rectangular mounting-member in the form of a plate-like hub or collet 10 formed of brass or other suitable material and provided substantially in its center with a bore 11 adapted to receive a balance-staff 12. At one end the collet 10 is grooved by a turning or other suitable operation to provide a hairspring-seat 13 which is longitudinally curved in a direction substantially concentrically with respect to the bore 11, and extends transversely in a direction parallel to the axis of the said bore.

It may here be noted that hairspring-tails such as 20, as heretofore made, vary considerably both in length and in angle with respect to the hairsprings proper, and are more often than not materially out of plane therewith. Due to these almost inevitable variations, it is preferable to secure the hairspring to the collet by clamping such portion of the former as may be relied upon to be of uniform shape.

Extending outwardly beyond the hairspring-seat 13, on the respective opposite sides thereof, are curved clamping-lips 14—14 adapted to be bent inwardly toward each other, as shown particularly well in Fig. 3, to clamp a spirally-curved portion 15 of a spiral hairspring 16 against the hairspring-seat 13 of the collet 10 before referred to. Preferably, and as shown, the said hairspring 16 is formed of wire having substantially-rectangular form in cross-section, though obviously, wire of other cross-sectional form may be employed. The hairspring shown may be conveniently produced by employing an initially-round wire and flattening the same on its respective opposite sides by a suitable rolling operation.

The dimension A (Fig. 4) from the center of the bore 11 to the outer edges of the clamping-lips 14 exceeds the dimension B from the center of the said bore to the opposite curved edge 17 of the hub or collet 10, despite which the bore 11 substantially coincides with the center of gravity of the collet by reason of the fact that the latter is wider at its edge 17 than it is at the outer edges of the clamping-lips 14. From the proportioning just described, the collet 10 possesses substantial balance both statically and dynamically.

Centrally of its edge 17, the collet 10 is formed with a relatively-deep radial notch 18 having its inner terminal-wall closely approaching the bore 11 but separated therefrom by a relatively-thin tie-web 19 which will readily stretch or fracture when the collet 10 is staked upon the balance-staff 12.

It will be noted that the usual tail 20 at the inner end of the hairspring 16 (formed as a result of the operation of coiling the hairspring itself) occupies the space between the adjacent convolution of the hairspring and the adjacent sloping side face of the collet 10.

In assembling the unit, the portion 15 of the spiral-reach of the hairspring 16 is placed against the hairspring-seat 13, and the respective clamping-lips 14—14 are simultaneously bent toward each other by suitable dies or tools so that the flat inner face of the said portion 15 of the hairspring is clamped tightly against the hairspring-seat 13, thus assuring that the hairspring, considered as a whole, will extend in a plane perpendicular to the axis of the bore 11 and the balance-staff 12.

In the outer corner of each of the clamping-lips 14—14 is shown a shallow groove 21 created by the action of the tools or dies in bending the said clamping-lips toward each other, as described.

After the hairspring 16 and its hub or collet 10 have been assembled together, as above described, the collet may be driven over a balance-staff such as 12 so as to become rigidly attached thereto. Inasmuch as it is preferable to have the diameter of the bore 11 in the collet slightly smaller in diameter than the diameter of the balance-staff 12, when the collet is forced over the staff 12 as just above described, the tie-web 19 will stretch and in most instances fracture as indicated in Fig. 1. By leaving the tie-web 19 interposed between the inner end of the notch 18 and the bore 11, instead of extending the said notch entirely through to the said bore, such burring of the latter as might cause the canting of the collet on the balance-staff is avoided.

Furthermore, by means of the tie-web 19, the collet, together with the hairspring, may, after being mounted on the balance-staff, be oriented with respect thereto, as may be required to set the beat of the watch, clock, or other time-instrument in which the unit is mounted. Despite the fact that the tie-web 19 may be fractured in forcing the collet over the balance-staff, the grip of the former upon the latter is sufficient to retain both in relatively-fixed positions under normal operating conditions, while permitting relative adjustment between them for the purpose described.

Inasmuch as the hairspring-seat 13 substantially conforms in lengthwise direction to the curvature of the spiral portion 15 of the hairspring, the latter will be substantially concentric with the bore 11 and hence with the balance-staff 12, when the said portion 15 is snugly pressed against the said seat. By the arrangement just described, it is unnecessary to employ the services of expert craftsmen to bend the hairspring to cause it to centrally locate itself with respect to the bore 11.

Due to the fact that laterally the hairspring-seat 13 extends parallel to the axis of the bore 11, the plane of the hairspring considered as a whole will be truly perpendicular with respect to the axis of the balance-staff 12, owing to the fact that the said hairspring is firmly clamped against the said seat 13. Thus, it is not necessary to employ the services of expert craftsmen to bend the hairspring laterally in order to effect the perpendicular relationship just referred to.

In Fig. 6 is shown a hub or collet 10ª having parallel side edges and provided with a bore 11ª for the reception of a suitable balance-staff. Like the collet 10, the collet 10ª is provided with a radial notch 18ª extending inwardly from its curved edge 17ª and having its inner terminal separated from the bore 11ª by a fracturable tie-web 19ª.

Also like the collet 10, the collet 10ª is provided with a hairspring-seat extending longitudinally in a direction substantially-concentrically with respect to the bore 11ª, and while the said seat may be viewed in effect as one, it is divided into three sections 13ª, 13ᵇ and 13ᶜ by forming the collet with two relatively-shallow notches 22—22. Instead of having continuous clamping-lips 14, the collet 10ª is formed on each of the opposite sides of its hairspring-seat with a clamping-lip which is divided by the said notches into three sections 14ª, 14ᵇ and 14ᶜ, each set of which is adapted to be bent toward the other set to clamp a portion of the spiral-reach of the hairspring against the hairspring-seat.

In Figs. 7 and 8 is shown a collet 23 formed substantially centrally with a bore 24 receiving a balance-staff 25. Like the collets before described, the collet 23 is formed in one end with a relatively-deep notch 26, the inner terminal of which closely approaches the bore 24 and is separated therefrom by a relatively-slender tie-web 27.

While it is preferred to grip a hairspring by means of a portion of its spiral-reach, the collet 23 now being described is designed to grip the off-setting tail 28 of a hairspring 29. By careful manufacturing methods, the tail 28 may have a carefully predetermined angular relationship with respect to the hairspring 29 proper, and may be seated against a flat hairspring-seat 30 constituting the bottom of a groove 31 formed in the end of the collet 23 opposite the notch 26 therein. Flanking the respective opposite sides of the hairspring-seat 30 are a pair of complementary clamping-lips 32—32 adapted to be bent inwardly toward each other to force the flat inner face of the tail 28 of the hairspring 29 into surface engagement with the hairspring-seat 30 over substantially all of the area thereof.

In Figs. 9 to 11 inclusive is shown a collet 33 provided with a concave hairspring-seat 34 interrupted by a notch 35 and flanked on either side by complementary clamping-lips 36—36, also interrupted by the notch 35 just referred to.

The clamping-lips 36—36, above referred to, are bent inwardly toward each other in any suitable manner to clamp the flat inner face of the tail 37 of a hairspring 38 against the hairspring-seat 34 throughout substantially the entire surface area thereof.

The tail 37 may be formed straight at a carefully predetermined angle with respect to the hairspring 38, if desired, as the tail 28 of Figs. 7 and 8 and the central portion of the said tail may be flexed inwardly by an instrument acting through the notch 35 in the collet 33 prior to the bending of the clamping-lips 36—36.

Opposite the notch 35, the collet 33 is formed with a relatively-deep notch 39 separated from the bore 40 of the collet by a slender tie-web 41.

It will be noted that in all of the forms of the present invention herein shown, the portion of a hairspring chosen for direct attachment to the collet is engaged with and conformed to the hairspring-seat of the latter over a large surface area thereof, rather than having a mere line contact therewith.

Thus, by providing a seat of predetermined character and clamping a portion of the hairspring against a two-dimensional surface thereof, a hairspring assembly may be provided in which the hairspring has the desired degree of concentricity and planar accuracy.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

We claim:

1. In a hairspring assembly, the combination with a balance-staff; of a spiral hairspring; and a mounting-member secured to and extending laterally from the said balance-staff and having an outwardly-facing hairspring-seat longitudinally-curved substantially-concentrically with respect to the said balance-staff and extending transversely in a direction substantially-parallel therewith, the said mounting-member also having a staff-receiving bore and a notch separated from the said bore by a fracturable tie-web; a portion of the spiral-reach of the said hairspring being firmly seated against the hairspring-seat of the said mounting-member.

2. In a hairspring assembly, the combination with a balance-staff; of a spiral hairspring; and a mounting-member laterally extending from the said balance-staff and having the said spiral hairspring attached thereto; the said mounting-member being provided with a bore for the reception of the said balance-staff and with a notch separated from the said bore by a relatively-slender tie-web.

3. In a hairspring assembly, the combination with a balance-staff; of a non-circular mounting-member secured to and extending laterally from the said balance-staff and having a relatively-short outwardly-facing hairspring-seat having a terminal-edge at each of its respective opposite ends, the said mounting-member also having two complementary clamping-lips extending substantially-perpendicularly with respect to the said balance-staff and respectively located on opposite sides of the said hairspring-seat and bent toward each other; and a spiral hairspring having its inner portion in two-dimensional surface-contact with the hairspring-seat of the said mounting-member and clamped in place against the same by the said bent complementary clamping-lips and substantially conforming thereto, the said hairspring projecting from one of the terminal-edges of the said hairspring-seat.

4. In a hairspring assembly, the combination with a balance-staff; of a non-circular mounting-member secured to and extending laterally from the said balance-staff and having a relatively-short outwardly-facing longitudinally-curved hairspring-seat of segmental form, the said hairspring-seat having a terminal-edge at each of its respective opposite ends, the said mounting-member also having two complementary clamping-lips extending away from the said balance-staff and respectively located on the opposite sides of the said longitudinally-curved hairspring-seat and bent toward each other; and a spiral hairspring having its inner portion in two-dimensional surface-contact with the curved hairspring-seat of the said mounting-member and clamped in place against the same by the said bent complementary clamping-lips and substantially conforming to the said hairspring-seat, the said hairspring projecting from one of the terminal-edges of the said hairspring-seat.

WILLIAM BARTON EDDISON.
JOHN V. McADAM.